US006996565B2

(12) United States Patent
Skufca et al.

(10) Patent No.: US 6,996,565 B2
(45) Date of Patent: *Feb. 7, 2006

(54) SYSTEM AND METHOD FOR DYNAMICALLY MAPPING DYNAMIC MULTI-SOURCED PERSISTED EJBS

(75) Inventors: Jim Skufca, Austin, TX (US); David Smith, Austin, TX (US); Rob Bugh, Austin, TX (US); John Buslawski, Austin, TX (US)

(73) Assignee: Initiate Systems, Inc., Chicago, IL (US)

( * ) Notice: Subject to any disclaimer, the term of this patent is extended or adjusted under 35 U.S.C. 154(b) by 545 days.

This patent is subject to a terminal disclaimer.

(21) Appl. No.: 10/064,965

(22) Filed: Sep. 4, 2002

(65) Prior Publication Data

US 2003/0051063 A1 Mar. 13, 2003

Related U.S. Application Data

(60) Provisional application No. 60/317,700, filed on Sep. 6, 2001.

(51) Int. Cl.
*G06F 17/30* (2006.01)

(52) U.S. Cl. ...................................... 707/10; 707/104.1

(58) Field of Classification Search .................... 707/3, 707/10, 100, 104.1; 705/1, 8, 36; 709/201, 709/202, 223, 246; 711/209; 715/513; 719/310, 719/315

See application file for complete search history.

(56) References Cited

U.S. PATENT DOCUMENTS 6,449,620 B1 9/2002 Draper et al.
6,757,708 B1 * 6/2004 Craig et al. ................. 709/203
2002/0152422 A1 * 10/2002 Sharma et al. ................ 714/13

FOREIGN PATENT DOCUMENTS

WO WO 01/59586 A2 8/2001
WO WO 01/75679 A1 10/2001

OTHER PUBLICATIONS

Scott W. Ambler, Overcoming data design challenges, Aug. 2001, pp. 1-3.*

* cited by examiner

*Primary Examiner*—Apu M. Mofiz
(74) *Attorney, Agent, or Firm*—DLA Piper Rudnick Gray Cary US LLP; Andrew V. Smith

(57) ABSTRACT

Dynamic Multi-sourced Persisted Enterprise Java Bean (EJB) instances are dynamically created on a J2EE compliant Application Server to access data contained in multiple data source systems. This Dynamic Multi-sourced Persisted EJB is a general class responsible for dynamically aggregating source system information and it to data in the source systems based on a Context definition. Individual EJB attributes that include mapping, caching and security definitions are mapped to individual pieces of data in source systems by the Context definition. A mapping definition can be reloaded during execution as desired. Applications can access the Dynamic Multi-sourced Persisted Entity EJB directly, or use a Session EJB to create a static interface to the dynamically mapped, cached and secured data. Dynamic mapping of Context definition attributes to source system data for transferring data between client and source systems and for modifying data attributes are achieved without recoding, recompiling and redeploying of custom coded solutions.

16 Claims, 8 Drawing Sheets

When a SessionBean invokes the getAttr() method on the ContextBean, the ContextBean code is as follows:

```
public Object getAttr(String attrName) throws ContextException
{
...
  try {
    ...
    // If client not authorized to read attribute's throw exception.
    if ( !canAccessAttribute(attrName, true) ) {
      ...
      throw new CannotReadAttributeException(...);
    }
    // If cached attribute and we have latest value then return it.
    if (attrTuple.isCacheable) {
      if (attrTuple.isCached) {
        return attrTuple.value;
      }
    }
    // Else go to backend to get value for this attribute.
    // Add it to the cache and return it to the caller.
    // Walk the tree to make sure all dependents are cached
    ...
    while ( tuple.keyName != null ) {
      keyTuple = lookupAttr( tuple.keyName );
      if ( !keyTuple.isCached )
        keysAndAttrs.addElement( keyTuple.name );
      tuple = keyTuple;
    }
    ...
    getFromBackend( keysAndAttrs.toArray() );
    if ( attrTuple.isDirty )
      return attrTuple.value;
    else
      throw new ContextException(...);
  }
  ...
}
```

FIG. 6B

Shown below is sample session bean code and how it would invoke methods on the Dynamic Entity EJB:

```
public class CustomerBean implements SessionBean, CustomerIfc
{
...
  public String getFirstName(ContextKey contextKey)
  {
      ...
      com.journee.context.Context context = getContext(contextKey);
      return (String)context.getAttr("firstName");
  }
}
```

FIG. 7B

```
<?xml version="1.0" encoding="UTF-8"?>
<!DOCTYPE context SYSTEM "..\ContextType.dtd">
<context name="Customer">
      <adapterconfig name="Customer" initialpoolsize="0" maxpoolsize="0">
            <key attribute="id"/>
            <key attribute="billing.id"/>
            <key attribute="billing.day.id"/>
            <key attribute="billing.evening.id"/>
            <key attribute="shipping.id"/>
            <key attribute="shipping.day.id"/>
            <key attribute="shipping.evening.id"/>
      </adapterconfig>
      <attribute name="id" type="java.lang.Integer" cacheable="Y">
            <adapter name="Customer" field="id"/>
            <role name="Everyone" security="RW"/>
      </attribute>
                        .
                        .
                        .
      <attribute name="netWorth" type="java.lang.Double" cacheable="N">
            <adapter name="Customer" field="net_worth"/>
            <role name="Everyone" security="RW"/>
      </attribute>
      <structure name="billing">
            <attribute name="id" type="java.lang.Integer" cacheable="Y">
                  <adapter name="Customer" field="billing_address$id"/>
                  <role name="Everyone" security="RW"/>
            </attribute>
                        .
                        .
                        .
            <attribute name="zip" type="java.lang.String" cacheable="Y">
                  <adapter name="Customer" field="billing_address$zip"/>
                  <role name="Everyone" security="RW"/>
            </attribute>
            <structure name="day">
                  <attribute name="id" type="java.lang.Integer" cacheable="Y">
                        <adapter name="Customer" field="billing_address$day_phone$id"/>
                        <role name="Everyone" security="RW"/>
                  </attribute>
                        .
                        .
                        .
                  <attribute name="suffix" type="java.lang.String" cacheable="Y">
                        <adapter name="Customer"
field="billing_address$day_phone$suffix"/>
                        <role name="Everyone" security="RW"/>
                  </attribute>
            </structure>
            <structure name="evening">
                  <attribute name="id" type="java.lang.Integer" cacheable="Y">
                        <adapter name="Customer"
field="billing_address$evening_phone$id"/>
                        <role name="Everyone" security="RW"/>
                  </attribute>
```

FIG. 9A

```
                        .
                        .
                        .
                  <attribute name="suffix" type="java.lang.String" cacheable="Y">
                        <adapter name="Customer"
field="billing_address$evening_phone$suffix"/>
                        <role name="Everyone" security="RW"/>
                  </attribute>
            </structure>
      </structure>
      <structure name="shipping">
            <attribute name="id" type="java.lang.Integer" cacheable="Y">
                  <adapter name="Customer" field="shipping_address$id"/>
                  <role name="Everyone" security="RW"/>
            </attribute>
                        .
                        .
                        .
            <attribute name="zip" type="java.lang.String" cacheable="Y">
                  <adapter name="Customer" field="shipping_address$zip"/>
                  <role name="Everyone" security="RW"/>
            </attribute>
            <structure name="day">
                  <attribute name="id" type="java.lang.Integer" cacheable="Y">
                        <adapter name="Customer" field="shipping_address$day_phone$id"/>
                        <role name="Everyone" security="RW"/>
                  </attribute>
                        .
                        .
                        .
                  <attribute name="suffix" type="java.lang.String" cacheable="Y">
                        <adapter name="Customer"
field="shipping_address$day_phone$suffix"/>
                        <role name="Everyone" security="RW"/>
                  </attribute>
            </structure>
            <structure name="evening">
                  <attribute name="id" type="java.lang.Integer" cacheable="Y">
                        <adapter name="Customer"
field="shipping_address$evening_phone$id"/>
                        <role name="Everyone" security="RW"/>
                  </attribute>
                        .
                        .
                        .
                  <attribute name="suffix" type="java.lang.String" cacheable="Y">
                        <adapter name="Customer"
field="shipping_address$evening_phone$suffix"/>
                        <role name="Everyone" security="RW"/>
                  </attribute>
            </structure>
      </structure>
</context>
```

FIG. 9B

SYSTEM AND METHOD FOR DYNAMICALLY MAPPING DYNAMIC MULTI-SOURCED PERSISTED EJBS

CROSS REFERENCE TO RELATED APPLICATIONS REFERENCED-APPLICATIONS

This application claims benefit of U.S. Provisional Application No. 60/317,700, filed on Sep. 6, 2001.

BACKGROUND OF INVENTION

The invention relates generally to electronic business transaction processing, and more particularly to systems for accessing back-end enterprise applications and data from the Internet by providing an intelligent, real-time data and logic cache that is synchronized with back-office systems.

Many business enterprises have collections of enterprise application systems that contain large volumes of disparate applications and data that are not compatible with the real-time, online transaction processing requirements of Internet web-based applications. Many of these systems were designed prior to the availability of the Internet. As a result, there exist many incompatibility issues between the various systems, including interface and synchronization incompatibilities as well as an inability to operate on a 24 hour, 7 days a week basis. For some applications, the data stored in disparate systems are related and requiring linking in a relational manner to provide useful information to customers, other companies and employees of an enterprise.

Because of the lack of a unified, coherent solution to the problems of connecting web-base applications to back office or legacy systems, many enterprises have to hire technical personnel to develop a unique solution to solve their own unique enterprise system problems. This approach oftentimes results in a less than optimum solution to the problem because of evolving technologies and lack of a sufficiently large, skilled workforce. More importantly, the burden with operating and maintaining a unique and usually non-flexible solution consumes large amounts of enterprise resources.

There is a need for a real-time transaction-processing platform that connects online web-based applications to back office enterprise systems while providing control over enterprise data and business rules. The platform must provide synchronization with back office systems to manage performance and enhance security of the online business environment. It must be easily and rapidly applied to a wide range of business environments while minimizing the burden of installing, operating, enhancing and maintaining the system. The system must be capable of providing high performing, reliable, fault tolerant, load balanced and scalable operation.

SUMMARY OF INVENTION

The present invention provides a real-time transaction-processing platform that connects online web-based applications to back office enterprise systems while providing control over enterprise data and business rules. It provides synchronization with back office systems, enhances security of online transaction processing, and is readily applied to a wide range of business environments. By minimizing the need for customized development through use of reliable, standard, reusable components, the costs associated with installing, operating, enhancing and maintaining the system are minimized. Through use of standard application servers and enterprise application interface technology, the system provides a high performance, reliable, fault tolerant load balanced scalable platform. The system enables consolidation of information from disparate back office systems into one easily manageable, real-time data cache and management services layer to enable complex online transactions across multiple channels.

The present invention relies on the Java 2 Enterprise Edition (J2EE™) standard defined by Sun Microsystems as a software architecture for use in constructing multi-tiered transaction systems. J2EE™ systems generally run on an application server that has been certified to be compliant with the J2EE™ standard specification. The J2EE™ standard is incorporated herein by reference. Several major manufacturers produce J2EE™ compliant application servers. The present invention also makes use of Enterprise JavaBeans™ (EJB™) as a component architecture for the development and deployment of component-based business applications. The Enterprise JavaBeans™ specification was created under the Java Community Process to provide full public participation in the definition and development. This specification is incorporated herein by reference.

The present invention is a unique and novel application of EJB™ in the form of a Dynamic Multi-sourced Persisted EJB. The Dynamic Multi-sourced Persisted EJB executes on a J2EE™ compliant web application server and uses a context definition that is read at runtime to map each EJB™ attribute to specific data in source systems. The Dynamic Multi-sourced Persisted EJB can be invoked from Session EJBs that in turn provide data to JavaServer Pages (JSP™) and/or servlets for creating a client interface. The Dynamic Multi-sourced Persisted EJB can also be invoked directly from client Java™ applications. The Dynamic Multi-sourced Persisted EJB uses Bean-Managed Persistence (BMP) supported by the J2EE™ architecture to optionally cache data accessed in source systems. The data is synchronized between the cache and source systems. This cache is persisted to disk to allow the application server to respect the standard J2EE™ EJB™ lifecycle. The Dynamic Multi-sourced Persisted EJB also provides a consistent attribute security model to limit unrestricted access to data.

In an embodiment of the present invention, a method for dynamically mapping Dynamic Multi-sourced Persisted EJB attributes to source system resources comprises creating a context definition containing attributes representing collections of source system data, specifying in an attribute mapping element whether each attribute in the context definition is mapped to a field in a data source, storing the context definition in a persistent data cache, creating an instance of a Dynamic Multi-sourced Persisted EJB, applying the attributes in the context definition to the created instance of the Dynamic Multi-sourced Persisted EJB for mapping the specified attributes to source system data fields, accessing mapped source system data by the Dynamic Multi-sourced Persisted EJB instance without requiring EJB compilation and deployment, and sending mapped attribute data from source systems to clients and from clients to source systems in response to client queries. The method may further comprise identifying a data source system table where the attribute value is located if the attribute is mapped, specifying whether each attribute in the context definition is cached, and specifying access security requirements for each attribute in the context definition. The method may further comprise reloading the context definition during execution on demand. The method may further comprise reloading the context definition during execution on a schedule. The step of storing the context definition may comprise creating a persistent cache table for managing context attributes during EJB Bean Managed Persistence lifecycle. The method may further comprise defining a key attribute to enable accessing mapped source system data through adapters. The method may further comprise specifying whether each mapped attribute in the context definition is mapped to a single field in a data source. The method may further comprise designating an attribute in the context definition to be mapped as a primary field in a data source, and writing data from the primary field in the data source to other multiple mapped secondary fields in a data source. The method may further comprise creating, reading, updating, and deleting data from clients to source systems and from source systems to clients, and updating attribute mapping elements. The method may further comprise keeping data in the cache synchronized and updated with the most recent data from clients to source systems, and from source systems to clients. The method may further comprise creating and loading a new context definition containing new attributes, applying the new attributes to the Dynamic Multi-sourced Persisted EJB instance for mapping the new attributes to source system data fields during runtime, recreating the persistent data cache, and immediately sending new attribute data to clients. The method may further comprise representing the context definition as an XML document. The method may further comprise storing selected source and client data in the persistent data cache. The step of creating an instance of a Dynamic Multi-sourced Persisted EJB may comprise creating and accessing an instance of a Dynamic Multi-sourced Persisted EJB from an external application using generic method calls of an application programming interface selected from the group consisting of create( ), find( ), getAttr( ), getAttrs( ), getGuid( ), setAttr( ), setAttrs( ) and retrieveNewAndDeletedContexts( ). The method may further comprise performing runtime checks prior to executing a method call including querying a security engine to determine if the method call is authorized and querying back-end adapters to determine if there are pending back-end mapped data updates, for keeping cache data synchronized and updated with back-end mapped data. The step of creating an instance of a Dynamic Multi-sourced Persisted EJB may comprise creating and accessing an instance of a Dynamic Multi-sourced Persisted EJB from an external application through a Session EJB Wrapper using traditional method calls of an application programming interface selected from the group consisting of create( ), getAttributeName( ) and setAttributeName( ). The method may further comprise performing runtime checks prior to executing a method call including querying a security engine to determine if the method call is authorized and querying back-end adapters to determine if there are pending back-end mapped data updates, for keeping cache data synchronized and updated with back-end mapped data. The step of creating a context definition may further comprise creating a Map/Cache/Secure table. The step of sending attribute data to clients may comprise sending attribute data to client applications running on web browsers and sending attribute data to trusted Java applications running on client machines. Another embodiment of the present invention is a computer-readable medium containing instructions for controlling a computer system to implement the method above.

Yet another embodiment of the present invention is a system for dynamically mapping Dynamic Multi-sourced Persisted EJB attributes to source system resources that comprises means for creating a context definition for containing attributes representing collections of source system data, an element for specifying whether an attribute in the context definition is mapped to a field in a data source, means for storing the context definition in a persistent data cache within an application server, means for creating an instance of a Dynamic Multi-sourced Persisted EJB within the application server, means for applying the attributes in the context definition to the created instance of the Dynamic Multi-sourced Persisted EJB for mapping the specified attributes to source system data fields via back-end adapters, means for accessing mapped source system data by the Dynamic Multi-sourced Persisted EJB instance without requiring EJB compilation and deployment, and means for sending mapped attribute data from source systems to clients and from clients to source systems in response to client queries. Each attribute may comprise an element identifying a data source system table where the attribute value is located if the attribute is mapped, an element specifying whether the attribute is cached, and an element specifying access security requirements for the attribute. The system may further comprise means for defining a key attribute for enabling access to mapped source system data through adapters. Each mapped attribute specified in the context definition may be mapped to a single field in a data source system. An attribute in the context definition may be designated to be mapped as a primary field in a data source and data from the primary field may be written to other multiple mapped secondary fields in a data source. The context definition may be an XML document. The system may further comprise means for storing selected source and client data in the persistent data cache. The means for creating an instance of a Dynamic Multi-sourced Persisted EJB may comprise means for creating and accessing an instance of a Dynamic Multi-sourced Persisted EJB from an external application using generic method calls of an application programming interface selected from the group consisting of create( ), find ( ), getAttr( ), getAttrs( ), getGuid( ), setAttr( ), setAttrs( ) and retrieveNewAndDeletedContexts( ). The system may further comprise means for performing runtime checks prior to executing a method call including means for querying a security engine to determine if the method call is authorized and means for querying back-end adapters to determine if there are pending back-end mapped data updates, for keeping cache data synchronized and updated with back-end mapped data. The means for creating an instance of a Dynamic Multi-sourced Persisted EJB comprises means for creating and accessing an instance of a Dynamic Multi-sourced Persisted EJB from an external application through a Session EJB Wrapper using traditional method calls of an application programming interface selected from the group consisting of create( ), getAttributeName( ) and setAttributeName( ). The system may further comprise means for performing runtime checks prior to executing a method call including means for querying a security engine to determine if the method call is authorized and means for querying back-end adapters to determine if there are pending back-end mapped data updates, for keeping cache data synchronized and updated with back-end mapped data. The context definition may comprise a Map/Cache/Secure Table. The means for sending attribute data to clients may comprise means for sending attribute data to client applications running on web browsers and sending attribute data to trusted Java applications running on client machines.

An alternative embodiment of the present invention is a system for dynamically mapping Dynamic Multi-sourced Persisted EJB attributes to source system resources that comprises an application server including contexts connected to JMS adapters, a data cache connected to the contexts in the application server for providing BMP data for mapping Dynamic Multi-sourced Persisted EJB attributes to back-end system data fields, system adapters for connecting JMS adapters to back-end systems, and an XML data storage device for providing context definition documents to the contexts and JMS adapters in the application server and to the system adapters. The contexts may include Dynamic Multi-sourced Persisted EJB instances and Session EJB Wrappers.

Yet another embodiment of the present invention is a system for dynamically mapping Dynamic Multi-sourced Persisted EJB attributes to source system resources that comprises a context definition containing attributes representing collections of source system data, an attribute mapping element for specifying whether each attribute in the context definition is mapped to a field in a data source, the context definition being stored in a persistent data cache, an instance of a Dynamic Multi-sourced Persisted EJB being created, the attributes in the context definition being applied to the created instance of the Dynamic Multi-sourced Persisted EJB for mapping the specified attributes to source system data fields, mapped source system data being accessed by the Dynamic Multi-sourced Persisted EJB instance without requiring EJB compilation and deployment, and mapped attribute data being sent from source systems to clients and from clients to source systems in response to client queries.

BRIEF DESCRIPTION OF DRAWINGS

These and other features, aspects and advantages of the present invention will become better understood with regard to the following description, appended claims, and accompanying drawings wherein:

FIG. 6B shows an embodiment of Dynamic Multi-sourced Persisted EJB code for the getAttr( ) method;

FIG. 7B is an example of Session EJB code for invoking methods in a Dynamic Multi-sourcedPersisted EJB;

FIG. 9 depicts an example of an XML document to define a Map/Cache/Secure Table.

DETAILED DESCRIPTION

Figure 1:
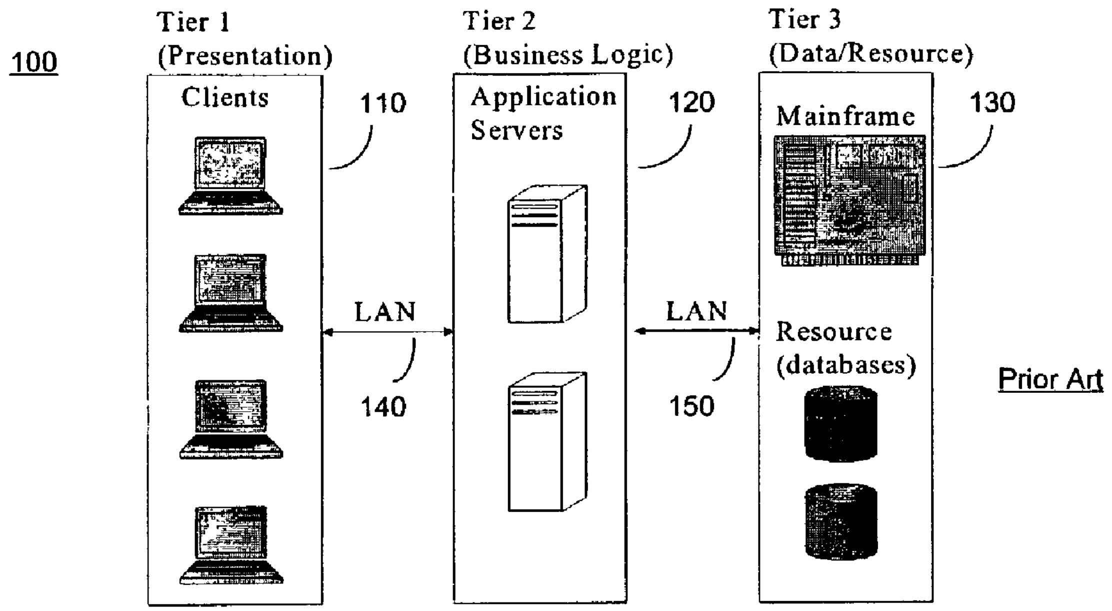
FIG. 1 shows a three-tiered client-server architecture for Internet applications.

Turning now to FIG. 1, FIG. 1 shows a three-tiered client-server architecture 100 for Internet applications. This architecture 100 is known to those skilled in the relevant art. Web application servers typically provide the middle tier 120 of a three-tiered architecture for Internet applications. Tier 1, 110 provides the presentation to the end-user of the application. Typically this consists of a web browser such as Netscape, or Internet Explorer interpreting HTML forwarded by a web server in Tier 2, 120 via a Local Area Network (LAN) 140. Tier 2, 120 provides the business logic. This business logic typically is written in Enterprise Java Beans (EJBs), Java Server Pages (JSPs), and servlets. Usually this tier can be broken down into a Web server and an Application server. The Web server JSPs and servlets "serve up" HTML pages to Tier 1, 110. The Application server executes EJBs to respond to JSP and servlet requests. Tier 3, 130 provides data and resources to Tier 2, 120 via a LAN 150 in the form of databases like DB2, CICS, conventional business applications (legacy/non-web), and possibly large processing power provided by mainframes.

Figure 2:
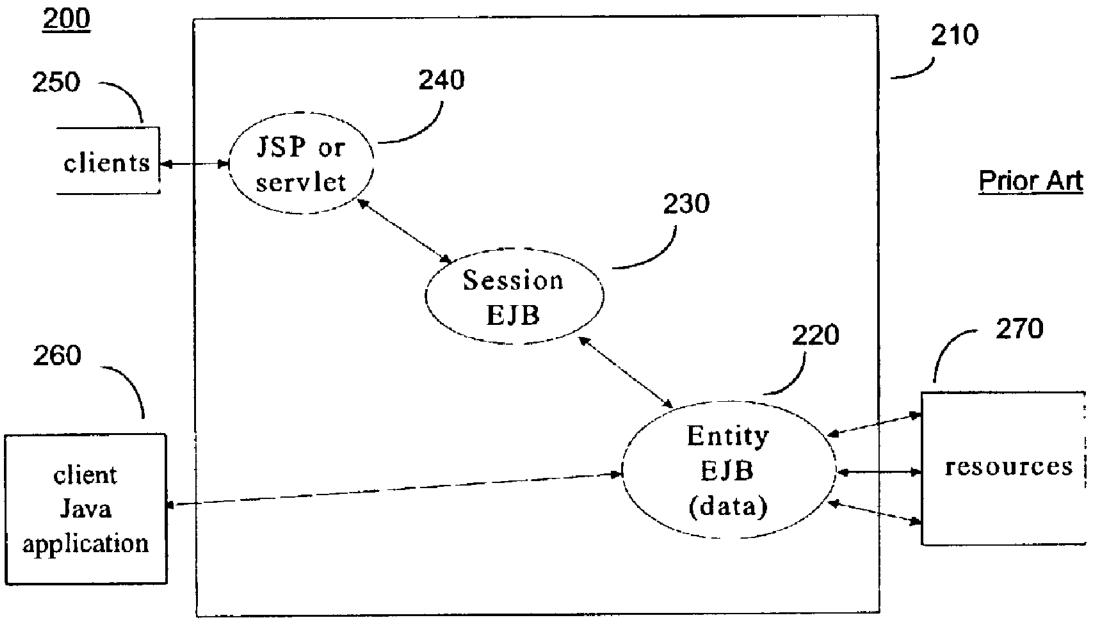
FIG. 2 shows a functional diagram of an application server.

Turning now to FIG. 2, FIG. 2 shows a functional flow diagram 200 of an application server 210. This functional flow 200 is known to those skilled in the relevant art. A session EJB 230 is typically created to communicate with a Java Server Page (JSP) or servlet process 240. The JSP or servlet 240 is responsible for creating the presentation layout on the clients 250. The session EJB 230 usually has the life cycle equal to the client session (user visiting a web page on a browser). The session EJB 230 also communicates with an Entity EJB 220. The Entity EJB 220 encapsulates permanent data and methods to manipulate that data. The life of an Entity EJB 220 is much longer than a session EJB 230. The Application Server will persist the Entity EJB and its data to a database or file in case of system failure/resource constraints. Alternatively, the Entity EJB 220 can be accessed directly from a client Java application 260. This simplifies programming by removing several layers of code in JSPs and servlets 240. The disadvantage is Java applications 260 do not execute in browsers over the world wide web. Entity EJBs 220 may also access resources 270 outside of the Application Server (Tier 2) 210 through JDBC calls or other connector interfaces. It is important to note that each resource 270 may be accessed by very different Application Programming Interfaces (APIs), and that the complexity and maintenance costs of the Entity EJBs 220 can be very high.

Figure 3:
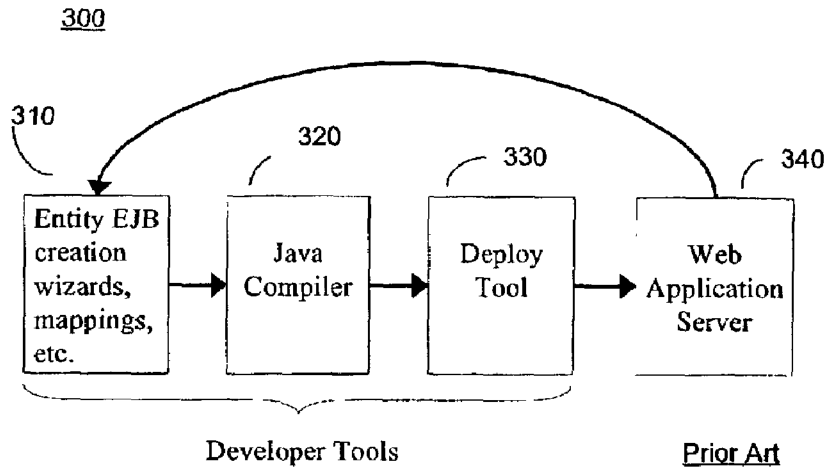
FIG. 3 shows a typical development cycle with compile-time tools.

Turning to FIG. 3, FIG. 3 shows a typical development cycle 300 with compile-time tools. This process 300 is known to those skilled in the relevant art. There are many compile-time developer tools are available to aid in generating the Entity EJB code 310 necessary to access the third tier resources in back office systems. Entity Beans are complex Java™ programs, and powerful tools are available to lead the developer through graphical user interfaces to help map EJB data elements 310, or attributes, to similar individual records in back-end databases. Once the developer has worked through the mapping, the tool will generate the Entity EJB code 310, compile it in a Java™ compiler 320, and in some cases deploy the tool 330 on an Application Server 340. These tools are effective for mapping the Entity EJB to Tier 3 resources, but they produce a static Entity EJB and as such lack an ability to dynamically manage the mapping once the Entity EJB is deployed. For example, highly skilled resources are necessary to simply re-map an Entity EJB attribute to a new column in a database. The entire Entity EJB must be reconstructed and reloaded into the tool set 310, recompiled 320, and then redeployed 330 on the Application Server 340.

Some tools provide options to "cache" EJBs in the Application Server's Container Managed Persistence (CMP). This results in many lines of code being generated. Often the flexibility of the cache is limited, and debugging is difficult. Furthermore, using CMP as the persistence mechanism limits the flexibility of controlling what is cached. These tools lack the ability to synchronize data between the CMP and back-end systems, and data is persisted either in CMP or back-end systems but not both.

Security mechanisms are typically managed through custom coding for each application, or web application server's mechanisms. The web application server mechanism can protect access to individual applications, or even individual method calls within an application. It is often difficult to manage secure access based on data elements. Any method level or application security is often applied redundantly for each application or set of EJBs.

Figure 4:
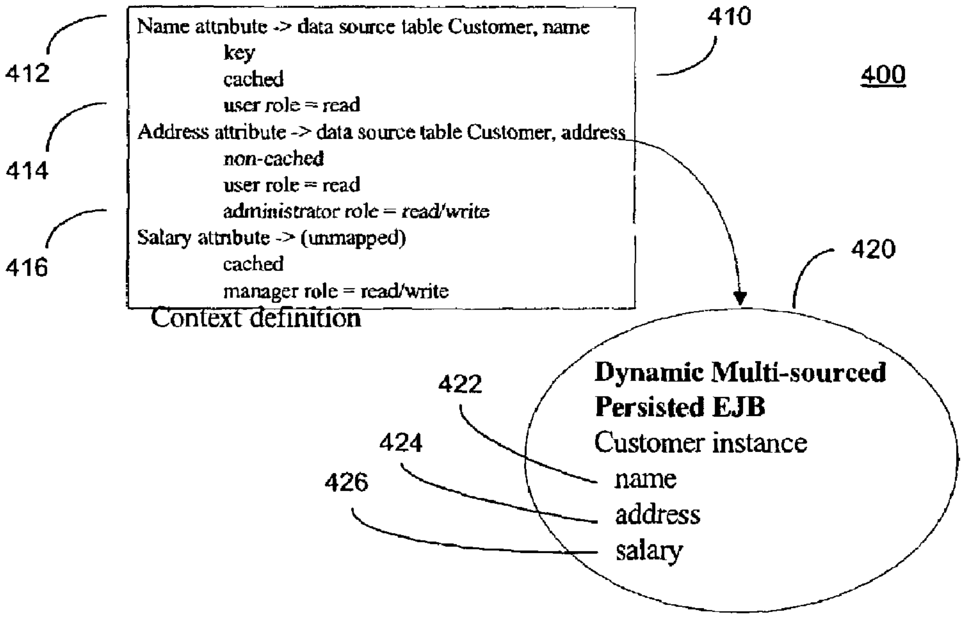
FIG. 4 shows the context definition of a Dynamic Multi-sourced Persisted EJB.

Turning now to FIG. 4, FIG. 4 shows an example of a context definition 400 of a Dynamic Multi-sourced Persisted EJB 420. Dynamic Multi-sourced Persisted EJBs are the subject of the present invention and are dynamically created on a J2EE compliant Web Application Server to access data contained in multiple back-end systems. The Dynamic Multi-sourced Persisted EJB is a general class that is responsible for mapping, caching, and securing data. The example context definition 410 is a customer instance, although it could reflect any data or data structure that may be mapped to a back-end system or stored in a cache. The attributes of the Dynamic Multi-sourced Persisted EJBs are defined and mapped to resources in data source systems without requiring compilation. This mapping results in synchronization of Dynamic Multi-sourced Persisted EJB data with data in the source systems. The Dynamic Mapping Context invention comprises a Context definition 410 that can be dynamically loaded during runtime. The Dynamic Multi-sourced Persisted EJB makes use of an external context definition that is read at runtime. Each Dynamic Multi-sourced Persisted EJB attribute can be:

1. Mapped or Unmapped (mapped to data-source, or only in cache)

2. Cached or non-cached (cached after first read, or always read/write direct to data source).

3. Secured or unsecured (role based read and write access, or security off)

FIG. 4 illustrates a Dynamic Multi-sourced Persisted EJB Customer instance 420 having attributes of name 422, address 424, and salary 426, and its associated Context definition 410 for mapping name 412, address 414, and salary 416. FIG. 4 represents an example of a Customer Context definition 410 for specifying mapping, caching, and security for a Customer instance of a Dynamic Multi-sourced Persisted EJB 420. A Name attribute 412 shown in FIG. 4 is mapped to the data source table Customer, in column "name", is cached, and a user has read privileges. An Address attribute shown in FIG. 4 is mapped to the data source table Customer, in column "address", is non-cached, a user has read privileges, and an administrator has read and write privileges. A Salary attribute shown in FIG. 4 is unmapped, is cached, and a manager has read and write privileges. Dynamic Multi-sourced Persisted EJBs 420 represent entities, or collections of data. Whenever a request is made to create an Dynamic Multi-sourced Persisted EJB instance of a specific entity, its context definition is applied. This definition table gives the Dynamic Multi-sourced Persisted EJB its dynamic quality by creating an EJB capable of handling data of the type specified in the Context definition. Without the disclosed Dynamic Multi-sourced Persisted EJB, it would have been to difficult to code a sub-class of the Entity EJB for each data type, and then hard code the mapping, security, and cache mechanisms for that data type. The present invention provides a mechanism to reload the context definition at anytime during execution, either on demand or on a schedule. Context definitions may be represented as Extensible Markup Language (XML) documents.

When a context definition is initially loaded, each attribute is individually mapped to a field in a data source. A persistent cache table is dynamically created to maintain the context attribute states during the EJB Bean Managed Persistence (BMP) lifecycle. Each Context attribute is persisted in the cache, which is implemented on a relational database. In the case where a "key" value is required for an adapter, the "key" is defined as an attribute of the context with a "key" designation. This allows the context to pass to the data source adapters all keys necessary to obtain data from the source system. Each attribute is typically mapped to a single field in a data source, but the invention allows for attributes to be multiply mapped, where one field is designated as primary. Data is then read from the primary field, and written to all the multiply mapped data source fields. Each data source adapter (i.e. JDBC, CORBA, etc.) is responsible for handling Create, Read, Update, and Delete (otherwise known as "CRUD") functions of data bi-directionally from context clients to data source systems, and data source systems to context clients. Some adapters may only have a limited subset of functions (e.g., read-only, or create only). Whenever a new Context definition is loaded, Dynamic Multi-sourced Persisted EJBs immediately adapt (if necessary) the mapping of attributes to data source fields and recreates the persistent cache. On subsequent reloads of the Context definition, an application server service is used to detect differences in the Context definition and rebuild the cache database if necessary. To rebuild the cache database, the system must perform the following operations:

Lock the cache database table;

Create a new temporary cache database table;

Copy the data from the old cache database table into the new temporary table;

Drop the old cache database table;

Rename the new table to replace the old table; and

Unlock the table.

Consuming applications immediately start receiving the new set of attributes.

The present invention is a system that is capable of dynamically aggregating source system information and managing it based on a Context definition without long tooling, compile, deploy development cycle that is typical of custom coded methods. Most Context definition changes can be dynamically adapted at runtime for mapping all the data in an enterprise. Definition of attributes of Dynamic Multi-sourced Persisted EJBs for mapping, caching, and securing, as illustrated in FIG. 4 are stored as XML documents. Table 1 addresses some of the changes to the context XML definition that may be encountered. Certain XML changes may need the cache to be rebuilt, and running applications may be impacted.

| Map/Cache/Secure change | How adapted | Running application impact |
|---|---|---|
| Attribute added | Rebuild cache database | No impactNew attribute can be accessed |
| Attribute deleted | Rebuild cache database | Not found exception returned if accessing deleted attribute |

-continued

| Map/Cache/Secure change | How adapted | Running application impact |
|---|---|---|
| Attribute renamed | Rebuild cache database with new meta information | Not found exception returned if accessing renamed attribute |
| Attribute data type changed | Rebuild cache database with new meta information and transform data during cache database copy | Cast exception returned if accessing the attribute for the data type that was changed |
| Attribute java.lang.String length exceeds string length in cache field | Rebuild cache database with new meta information | No impact |
| Attribute mapping switched to new data source system field | Cache synchronizes with new data source system field | No impact |
| Attribute unmapped, cached switched to mapped, cached | Cache synchronizes with data source system field | No impact |
| Attribute unmapped, cached switched to mapped, not cached | Context always goes to data source system | No impact |
| Attribute mapped, cached switched to unmapped, cached | Data source system synchronization stops | No impact |
| Attribute mapped, cached switched to mapped, not cached | Context always goes to data source system | No impact |
| Attribute mapped, not cached switched to mapped, cached | Build cache database and synchronize with data source system | No impact |
| Attribute mapped, not cached switched to unmapped, cached | Build cache database; no synchronization required | No impact |
| Attribute that is multiply mapped switches field of record | Read occurs from new data source system field | No impact |

Whenever a new Context definition is loaded, the system immediately changes the mapping of attributes to data source fields and recreates the persistent cache if necessary. Consuming applications immediately start receiving the new set of attributes.

Figure 5:
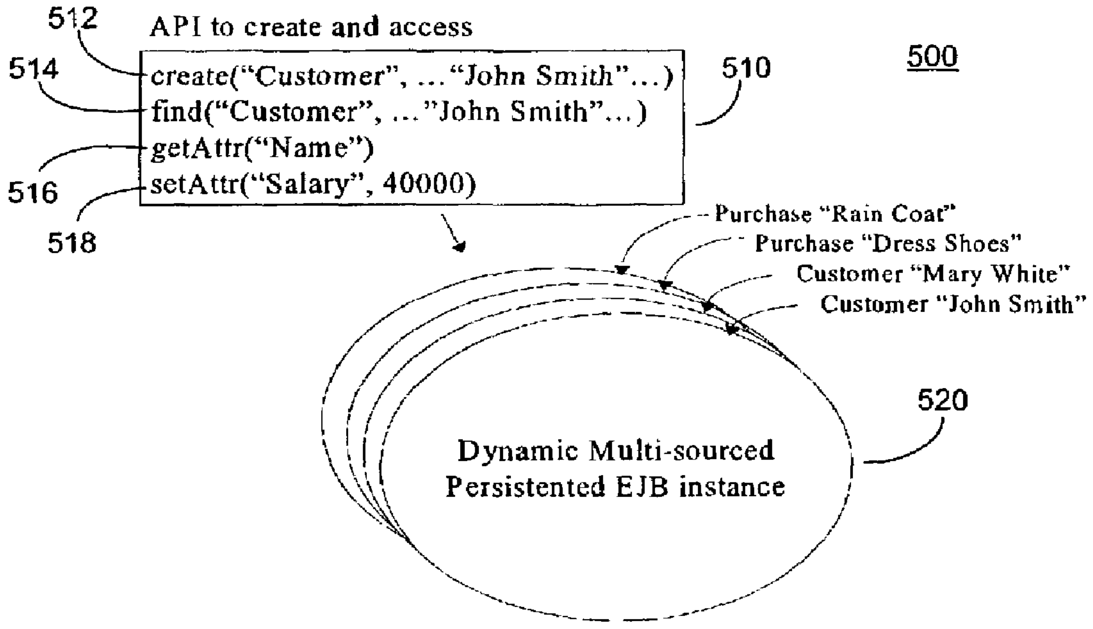
FIG. 5 depicts generic methods for accessing instances of Dynamic Multi-sourced Persisted EJBs.

Turning to FIG. 5, FIG. 5 depicts generic methods 500 for accessing instances of Dynamic Multi-sourced Persisted EJBs 520. Dynamic Multi-sourced Persisted EJB instances 520 are created and accessed using an Application Programming Interface (API) 510. When an External application needs to create a new Dynamic Multi-sourced Persisted EJB instance, a creates( ) method is exposed 512. When an external application needs to retrieve a list of context instances 520 that fit a given set of criteria, the Dynamic Multi-sourced Persisted EJB exposes find( ) methods 514 for retrieving lists of contexts for this purpose. The application may use the list as a collection of Dynamic Multi-sourced Persisted EJB instances, or may use a single element to reference a specific instance of a Dynamic Multi-sourced Persisted EJB. The Dynamic Multi-sourced Persisted EJB is table driven and "coded only once". Instead of writing unique EJB methods for each data type, the Dynamic Multi-sourced Persisted EJB presents a generic API to access the attributes. Attributes of Dynamic Multi-sourced Persisted EJB instances are not accessed with traditional coding patterns of getXxx( ) and setXxx( ), where "Xxx" represents the name of specific attributes. The present invention uses generic methods getAttr( ) 516 and setAttr( ) 518 instead of getXxx( ) and setXxx( ). Table 2 lists the generic method calls used by a generic API to access Dynamic Multi-sourced Persisted EJB attributes.

| | |
|---|---|
| Java.lang.Object | getAttr (java.lang.String method for arbitrary attribute |
| java.util.HashMap | getAttrs (java.util.Vector getter method for arbitrary attributes. |
| Java.lang.String | getGuid () unique GUID associated with a Dynamic Multi-sourced Persisted EJB instance. |
| Java.util.HashMap [] [] | retrieveNewAndDeletedContexts (java.lang.String new and deleted instances of a specific type. |
| void | setAttr (java.lang.Stringjava.lang.Object method for arbitrary attribute |
| java.util.HashMap | setAttrs (java.util.HashMap) setter method for arbitrary attributes. |

Figure 6A:
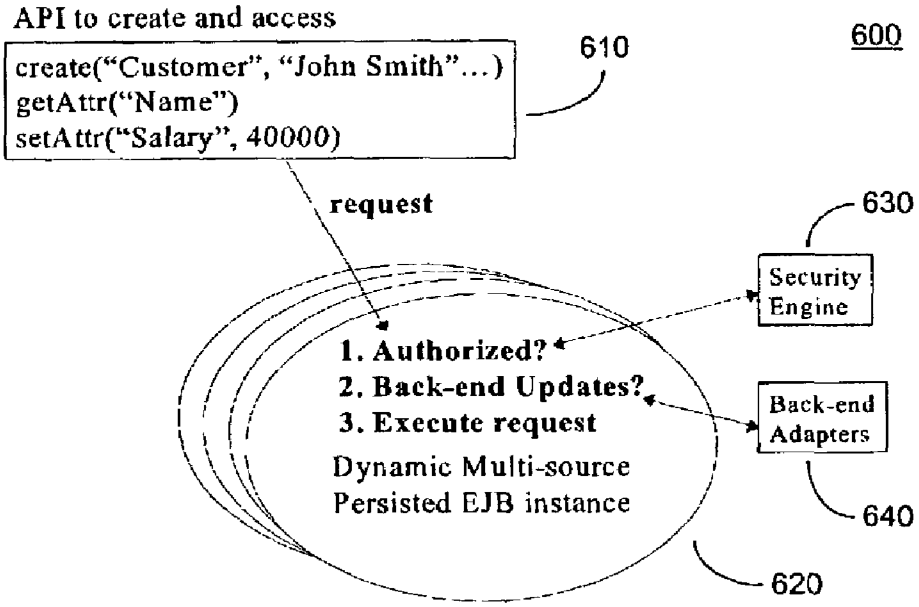
FIG. 6A illustrates checks that are conducted before a method call request is executed.

Turning to FIG. 6A, FIG. 6A illustrates checks that are conducted before a method call request is executed 600 via an API involving a Dynamic Multi-sourced Persisted EJB instance 620. At the time a Dynamic Multi-sourced Persisted EJB instance is created or accessed by an API 610, two additional runtime checks are made before a method call may be executed. A Security Engine 630 is queried to determine if the method call request is authorized, and Back-end Adapters 640 are queried to determine if there are back-end updates. The authorization check validates that the caller has authorization to access the data of particular attributes. If authorization is not validated, an exception is returned. The back-end update check applies or clears any pending back-end data updates to the cache before executing a getAttr( ) or setAttr( ) request. FIG. 6B shows an embodiment of Dynamic Multi-sourced Persisted EJB code for the getAttr( ) method, and illustrates the use of Authorization and Back-end Updates.

Figure 7A:
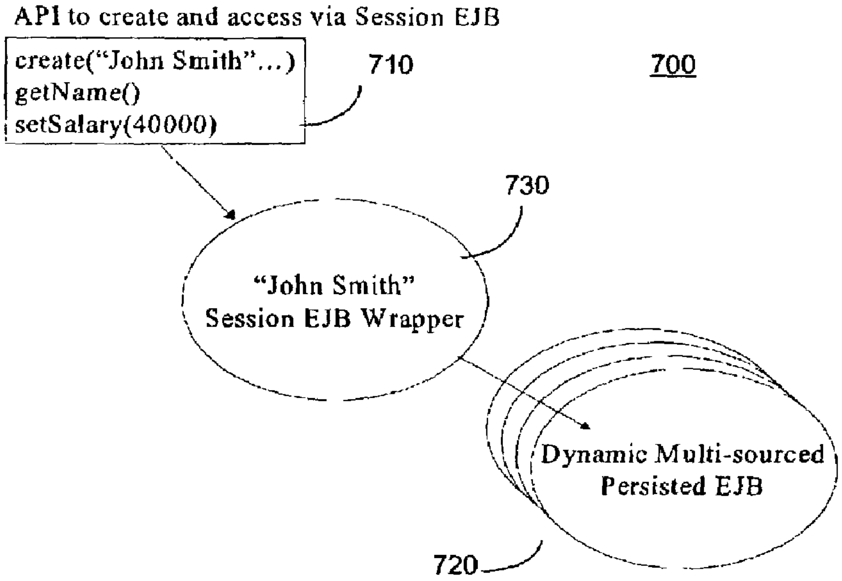
FIG. 7A show a traditional Session EJB Wrapper in the method execution process.

Turning now to FIG. 7A, FIG. 7A shows a traditional Session EJB Wrapper 730 in the method execution process 700. If an application desires to access a Dynamic Multi-sourced Persisted EJB 720 with a traditional Session EJB Wrapper 730, then the generic getAttr( ) and setAttr( ) methods accessed via an API 710 are exposed to the applications with the traditional getXxx( ) and setXxx( ) method patterns, where "Xxx" is the attribute name. FIG. 7B is an example of Session EJB code for invoking methods in a Dynamic Multi-sourced Persisted EJB, as shown in FIG. 7A.

Figure 8:
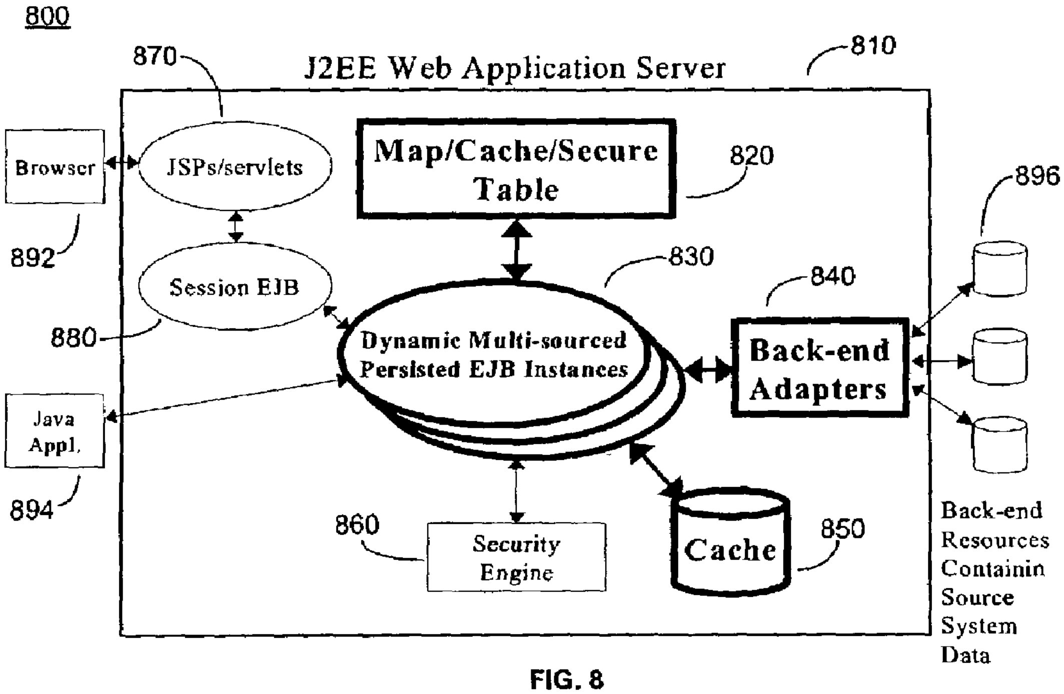
FIG. 8 shows a functional diagram of a system implementation of the present invention.

Turning to FIG. 8, FIG. 8 shows a functional diagram 800 of a system implementation of the present invention. It depicts a system capable of dynamically aggregating back-end system information and managing it, without the long tooling, compile, deploy development cycle of other methods. Other benefits include low maintenance of mapping, performance improvements by caching hard to reach data, and a uniform security policy for all the data in an enterprise. FIG. 8 illustrates Dynamic Multi-sourced Persisted EJB instances 830 executing on a J2EE™ compliant Web Application Server 810 and uses a Map/Cache/Secure Table 820 that is read in at runtime to control access to each Dynamic Multi-sourced Persisted EJB attribute. The Dynamic Multi-sourced Persisted EJB instances 830 can be invoked from Session EJBs 880 that in turn provide data to JSPs and/or servlets 870 for creating a client interface to a web Browser 892. Alternatively, Dynamic Multi-sourced Persisted EJB instances 830 may be invoked directly from client Java™ applications 894. The Dynamic Multi-sourced Persisted EJB uses Bean Managed Persistence (BMP) supported by the J2EE™ architecture to optionally cache source system data in a Cache 850 accessed in Back-end Systems 896 via Back-end Adapters 840. Data is synchronized between the Cache 850 and Back-end Systems 896. The Cache 850 is persisted to disk to allow the Application Server 810 to respect the EJB life cycle. Also, the Dynamic Multi-sourced Persisted EJBs provide a consistent attribute Security Engine 860 to protect unrestricted access to the data. FIG. 9 depicts an example of an XML document to define a Map/Cache/Secure Table 820 for defining the attributes of a Dynamic Multi-sourced Persisted EJB instance 830 shown in FIG. 8.

Once Context attributes of Dynamic Multi-sourced Persisted EJB instances 830 in the Map/Cache/Secure Table 820 have been designated as cached 850, the system 810 synchronizes the cache data 850 with updates from Client Applications 892, 894 or updates from the Back-end Resources 896. Communication between the Context runtime and the Back-end Adapters 840 ensures that any creates, updates or deletes of data from the Context clients 892, 894 are sent to the Back-end Adapters 840 to keep the data source systems 896 in synchronization with the Cache 850. The Back-end Adapters 840 also notify the Contexts 830 when create, updates, or deletes occur originate in the data source system 896. By default, if creates, updates, or deletes occur simultaneously on the client systems 892, 894 and data source systems 896 for the same data, the client change prevails. However, the Context Definition 820 can specify that the data source 896 change prevails. In either case, all conflicts will be logged. Since Context attributes 820 have been cached into a relational database 850, the system allows the client applications 892, 894 to query the Cache 850 for data. This feature provides for higher performance when searching for data that may have originated from slower data source systems, and for joining of query results across multiple data source systems 896.

Figure 10:
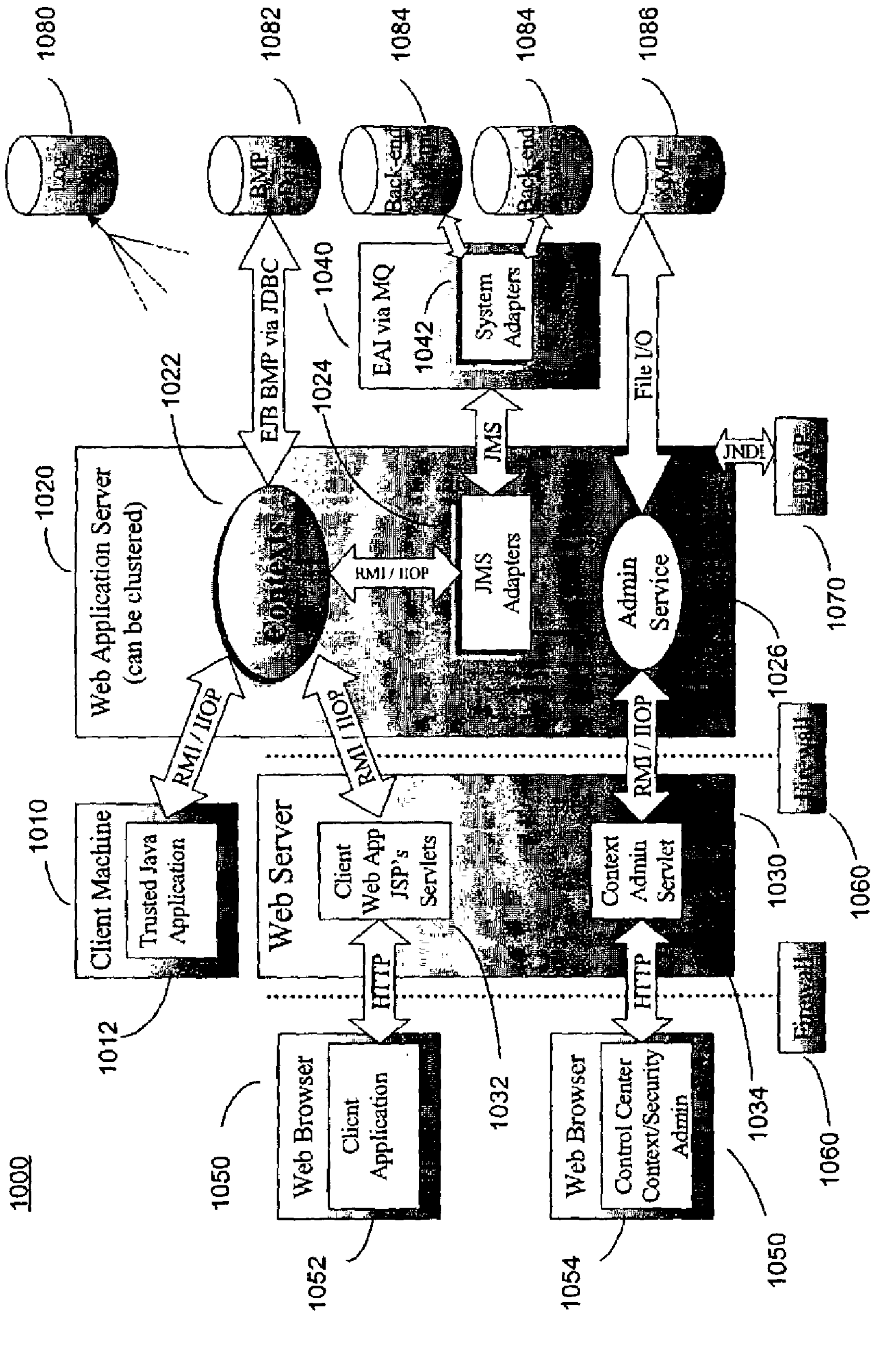
FIG. 10 shows an embodiment of the present invention in a system environment.

Turning to FIG. 10, FIG. 10 shows an embodiment 1000 of the present invention in a system environment. The "Contexts" (Dynamic Multi-sourced Persisted EJBs and Session EJB Wrappers) 1022, "BMP Data" (cache or SMARTcache) 1082, and "JMS Adapters" (back-end adapters) 1024 are at the heart of the present invention. The following terms are useful in the understanding the system model 1000.

Object model—the abstract representation of a set of java classes that together represent an entity such as customer, product, part, or agent. Object models are the beginning point for the creation of Contexts 1022.

Context—the java representation within the system of Dynamic Multi-sourced Persisted EJBs and Session EJB wrappers as object models.

Context Instance—a specific instance of a Context 1022; e.g., the instance of the customer class pertaining to customer #12345.

SMARTcache—the collective term for the persistent store of Contexts 1022 as data 1082.

Control Center—1054 the console within the system 1000 from which the SMARTcache administrator configures, maps, and monitors Contexts 1022.

Mapping—the correlation between a data element (attribute) and a field in a Back-end System 1084.

Adapter—a piece of java code that enables the interchange of data between the system 1000 and other applications (including EAI 1040).

JMS Adapter—1024 a connector between the Context EJBs 1022 and a java Messaging Service API into an EAI layer 1040.

System Adapter—1042 a connector between the EAI messaging layer and an element of the existing IT infrastructure 1084.

Accelerator—the term for the components of the system that expedite development and refinements of contexts, mappings, and deployments.

A calling application initiates a system transaction, which may be in the form of a Trusted Java Application 1012 in a Client Machine 1010, or a Client Application 1052 in a Web Browser 1050 via a Client Web Application Servlet 1032 within a Web Server 1030. A Control Center 1054 within a Web Browser 1050 contains tools for administering the Context attribute mappings and security roles via a Context Administration Servlet 1034 in a Web Server 1030. Firewalls 1060 maintain security between Web Browsers 1050 and a Web Server 1030, between the Web Server 1030 and a Web Application Server 1020, and between Client Machines 1010 and the Web Application Server 1020. The Web Application Server 1020 is a runtime server in which a set of Context objects 1022 synchronize with Back-end Systems 1084 via JMS Adapters 1024 and System Adapters 1042. A J2EE EJB client application 1012 invokes an EJB method to communicate with Contexts 1022 via RMI over IIOP protocol. RMI/IIOP is one J2EE standard way of allowing an application developer to code to an RMI interface.

The Control Center 1054 is the development and management environment for the system platform 1000. The Control Center 1054 provides the following capabilities: view a list of defined Contexts; define, change, or delete mappings between data in Back-end systems and Context attributes; designate Context attributes as cached or non-cached; define, change or delete security authorizations for Context attributes; and view the runtime log. The Control Center 1054 also includes toolsets containing log configuration and analysis capabilities, system performance analysis tools, and control over automated features. The Control Center 1054 is a J2EE application comprising JSP, servlets, EJBs, and XML files. The Control Center 1054 is a J2EE browser client application, which enables remote administration of the system 1000. The Control Center 1054 communicates with an Administrative Service EJB 1026 via JSPs and a Context administrative Servlet 1034. The Administrative Service EJB 1026 reads and writes Context configuration data from a set of XML files 1086. The runtime server 1020 uses these same XML files 1086. If necessary, the XML files 1086 can be file system protected so that access is limited to selected applications. The Administrative Service 1026 retrieves roles that map into an LDAP (Lightweight Directory Access Protocol) system 1070. This list of roles is then presented within the "Edit Security" display of the Control Center 1054. Using this facility, specific roles may be associated with given attributes in a Context. The system runtime server 1020 also captures log data 1080, which can be presented on the "log view" display of the Control Center 1054.

The Web Application Server 1020 is the component of the system 1000 shown in FIG. 10 that enforces the rules established through the tools of the Control Center 1054. The runtime server 1020 responds to requests from calling applications, serving up Context instances 1022 on request, according to the security rules that have been established. It coordinates with the EAI solution 1040 to ensure that changes made through Contexts 1022 are coordinated with Back-end Systems 1084, and that changes made to Back-end System data are carried into the Context instance 1022. It stores the data that have been designated for caching in a disk cache 1082 that provides rapid access. It also logs activity data for diagnostic and monitoring purposes 1080.

Applications attach to a remote interface of the Context Session EJB (Dynamic Multi-sourced Persisted EJBs and Session EJB Wrappers) 1022. When a remote method invocation is made, several things occur:

The Context Session EJB 1022 validates the authority of the user to read or write each Dynamic Multi-sourced Persisted EJB attribute based on the LDAP roles defined in XML files 1086.

If authorized, the attribute data is read from or written to the Back-end Systems 1084 that were mapped in the XML files 1086. This is accomplished via JMS messages. The Application Server 1020 communicates with the EAI system 1040 via JMS Adapters 1024, and the EAI system 1040 communicates via System Adapters 1042 with each Back-end System 1084.

The attribute data is cached by the Context EJB 1022 and persisted locally by the, Application Server's Bean Managed Persistence (BMP) mechanism 1082.

Subsequent attribute data reads and writes occur out of the Context cache. Any data changes are queued and propagated to the back-end systems.

In addition, updates may occur directly to a Back-end Systems 1084 through another interface, which is independent of the present System 1000. In this case, the data changes are detected by System 1000 and propagated up to the Contexts 1022. Throughout the operations of the Web Application Server 1020, log data 1080 is captured by a logging service. This is useful for diagnostic and debugging purposes.

Central to the security solution for System 1000 are the security services provided by the Application Server 1020 hosting the various components. Most Application Servers provide a complete set of authentication, authorization, and delegation services, which can be configured when deploying the System 1000. Most Application Servers follow the J2EE™ security specifications to varying degrees, depending on the vendor and the release of the Application Server. Within the J2EE™ specification, the System Administrator configures most of the security services during deployment through a combination of deployment descriptors and Application Server configurations. The J2EE™ specification addresses role-based authorization on methods of a resource in the deployment descriptors and authentication mechanisms. However, the J2EE™ specification leaves the details of security enablement, mapping of logical role to installation specific principals, and delegation of credentials to the discretion of the Application Server vendors.

The following is a description of an embodiment of the present invention for providing authentication, authorization and delegation to the various system components that is reflective of the capabilities of a well-known application server. As a convenience, much of the security configuration is performed during the installation of a system.

Regarding authentication, when the application server security is enabled, authentication of system components is supported by a basic authentication challenge mechanism, i.e., user identification and password against an LDAP service. The application server supports various LDAP products. To enable authentication, global security for the entire application server installation must be enabled. Global security can be enabled either though an administration console or through scripts executed from the command line using a configuration utility. When launching the administration console with global security enabled, a user will be prompted for the user identification and password designated when installing the application server. When using an LDAP service to provide authentication, there are several site-specific parameters that need to be configured by an administrator including:

Vendor—the name of the LDAP vendor;

Host—the name of the machine hosting the LDAP service;

Port—the port number to use when connecting to the LDAP service;

Base DN—the base distinguished name to use when searching group or principal information, typically the top of the directory tree that is site specific;

User Filter—the filter to use when searching for principals; and

Group Filter—the filter to use when searching for groups.

The configuration of these parameters can be done from the administration console.

Regarding authorization, the J2EE™ specification allows the application developer and the application assembler to define role-based access on a method-by-method basis for EJBs and servlets. Since these are logical roles, there is some vendor-specific way to map the logical role into the principals and groups in the deployment environment. The system administrator is responsible for mapping the logical roles into groups and principals in the target environment. Some systems deviate from the J2EE™ specification when it comes to defining access control or authorization of servlets and EJBs. Role based authorization is enabled by creating an enterprise application that includes all web resources to be protected. Once the web resources have been added to the enterprise application, each method of a resource can be associated with a method group. Each method group is then given a set of principals (groups, roles, or principals) that have the authority to execute the associated methods. In addition, some systems do not directly allow for programmatic authorization. An embodiment of the present invention provides a mechanism for mapping logical roles to LDAP groups via a configuration file in the root system install directory. Each entry in this configuration file maps a system logical role to LDAP groups. For example, to map the system logical role "mktg" to an LDAP group called "Marketing", the entry would be "role.mktg=cn=Marketing". A user must configure the entries in this file to match the LDAP configuration. Once completed, the "edit security" context tool will present the system logical roles.

Regarding delegation, at a minimum, the J2EE™ specification says that the client's identity used to connect to the EJB server should be delegated to other EJBs in the same EJB server environment. Some servers allow method requests to be delegated as the client, a system identity, or some other specific identity. The system delegates client credentials across method calls.

Although the present invention has been described in detail with reference to certain preferred embodiments, it should be apparent that modifications and adaptations to those embodiments might occur to persons skilled in the art without departing from the spirit and scope of the present invention.

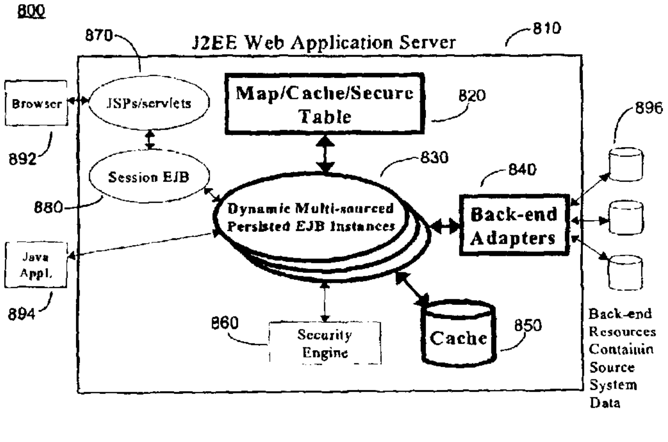

What is claimed is:

1. A method for dynamically mapping Dynamic Multi-sourced Persisted EJB attributes to source system resources, comprising:

creating a context definition containing attributes representing collections of source system data;

specifying in an attribute mapping element whether each attribute in the context definition is mapped to a field in a data source;

storing the context definition in a persistent data cache;

creating an instance of a Dynamic Multi-sourced Persisted EJB;

applying the attributes in the context definition to the created instance of the Dynamic Multi-sourced Persisted EJB for mapping the specified attributes to source system data fields;

accessing mapped source system data by the Dynamic Multi-sourced Persisted EJB instance without requiring EJB compilation and deployment; and sending mapped attribute data from source systems to clients and from clients to source systems in response to client queries.

2. The method of claim 1, further comprising:

identifying a data source system table where the attribute value is located if the attribute is mapped;

specifying whether each attribute in the context definition is cached; and specifying access security requirements for each attribute in the context definition.

3. The method of claim 1, further comprising reloading the context definition during execution on demand.

4. The method of claim 1, further comprising reloading the context definition during execution on a schedule.

5. The method of claim 1, wherein the step of storing the context definition comprises creating a persistent cache table for managing context attributes during EJB Bean Managed Persistence lifecycle.

6. The method of claim 1, further comprising defining a key attribute to enable accessing mapped source system data through adapters.

7. The method of claim 1, further comprising specifying whether each mapped attribute in the context definition is mapped to a single field in a data source.

8. The method of claim 1, further comprising:

designating an attribute in the context definition to be mapped as a primary field in a data source; and writing data from the primary field in the data source to other multiple mapped secondary fields in a data source.

9. The method of claim 1, further comprising creating, reading, updating, and deleting data from clients to source systems, and from source systems to clients, and updating attribute mapping elements.

10. The method of claim 9, further comprising keeping data in the cache synchronized and updated with the most recent data from clients to source systems, and from source systems to clients.

11. The method of claim 1, further comprising:

creating and loading a new context definition containing new attributes;

applying the new attributes to the Dynamic Multi-sourced Persisted EJB instance for mapping the new attributes to source system data fields during runtime;

recreating the persistent data cache; and immediately sending new attribute data to clients.

12. The method of claim 1, further comprising representing the context definition as an XML document.

13. The method of claim 1, further comprising storing selected source and client data in the persistent data cache.

14. The method of claim 1, wherein the step of creating an instance of a Dynamic Multi-sourced Persisted EJB comprises creating and accessing an instance of a Dynamic Multi-sourced Persisted EJB from an external application using generic method calls of an application programming interface selected from the group consisting of create( ), find( ), getAttr( ), getAttrs( ), getGuid( ), setAttr( ), setAttrs( ) and retrieveNewAndDeletedContexts( ).

15. The method of claim 14, further comprising performing runtime checks prior to executing a method call including querying a security engine to determine if the method call is authorized and querying back-end adapters to determine if there are pending back-end mapped data updates for keeping cache data synchronized and updated with back-end mapped data.

16. The method of claim 1, wherein the step of creating an instance of a Dynamic Multi-sourced Persisted EJB comprises creating and accessing an instance of a Dynamic Multi-sourced Persisted EJB from an external application through a Session EJB Wrapper using traditional method calls of an application programming interface selected from the group consisting of create( ), getAttributeName( ) and setAttributeName( ).

* * * * *

UNITED STATES PATENT AND TRADEMARK OFFICE

CERTIFICATE OF CORRECTION

PATENT NO. : 6,996,565 B2
APPLICATION NO. : 10/064965
DATED : February 7, 2006
INVENTOR(S) : Skufca et al.

It is certified that error appears in the above-identified patent and that said Letters Patent is hereby corrected as shown below:

Column 16, line 45, insert allowed claims 17-36:

-- 17. The method of claim 16, further comprising performing runtime checks prior to executing a method call including querying a security engine to determine if the method call is authorized and querying back-end adapters to determine if there are pending back-end mapped data updates for keeping cache data synchronized and updated with back-end mapped data.

18. The method of claim 1, wherein the step of creating a context definition further comprises creating a Map/Cache/Secure table.

19. The method of claim 1, wherein the step of sending attribute data to clients comprises sending attribute data to client applications running on web browsers and sending attribute data to trusted Java applications running on client machines.

20. A computer-readable medium containing instructions for controlling a computer system to implement the method of claim 1.

21. A system for dynamically mapping Dynamic Multi-sourced Persisted EJB attributes to source system resources, comprising:

means for creating a context definition for containing attributes representing collections of source system data;

an element for specifying whether an attribute in the context definition is mapped to a field in a data source;

means for storing the context definition in a persistent data cache within an application server;

means for creating an instance of a Dynamic Multi-sourced Persisted EJB within the application server;

means for applying the attributes in the context definition to the created instance of the Dynamic Multi-sourced Persisted EJB for mapping the specified attributes to source system data fields via back-end adapters;

Signed and Sealed this
Thirtieth Day of August, 2011

David J. Kappos
*Director of the United States Patent and Trademark Office* means for accessing mapped source system data by the Dynamic Multi-sourced persisted EJB instance without requiring EJB compilation and deployment; and
means for sending mapped attribute data from source systems to clients and from clients to source systems in response to client queries.

22. The system of claim 21, wherein each attribute comprises:
an element identifying a data source system table where the attribute value is located if the attribute is mapped;
an element specifying whether the attribute is cached; and
an element specifying access security requirements for the attribute.

23. The system of claim 21, further comprising means for defining a key attribute for enabling access to mapped source system data through adapters.

24. The system of claim 21, wherein each mapped attribute specified in the context definition is mapped to a single field in a data source system.

25. The system of claim 21, wherein an attribute in the context definition is designated to be mapped as a primary field in a data source and data from the primary field is written to other multiple mapped secondary fields in a data source.

26. The system of claim 21, wherein the context definition is an XML document.

27. The system of claim 21, further comprising means for storing selected source and client data in the persistent data cache.

28. The system of claim 21, wherein the means for creating an instance of a Dynamic Multi-sourced Persisted EJB comprises means for creating and accessing an instance of a Dynamic Multi-sourced Persisted EJB from an external application using generic method calls of an application programming interface selected from the group consisting of create(), find(), getAttr(), getAttrs(), getGuid(), setAttr(), setAttrs() and retrieveNewAndDeletedContexts().

29. The system of claim 28, further comprising means for performing runtime checks prior to executing a method call including means for querying a security engine to determine if the method call is authorized and means for querying back-end adapters to determine if there are pending back-end mapped data updates, for keeping cache data synchronized and updated with back-end mapped data.

30. The system of claim 21, wherein the means for creating an instance of a Dynamic Multi-sourced Persisted EJB comprises means for creating and accessing an instance of a Dynamic Multi-sourced Persisted EJB from an external application through a Session EJB Wrapper using traditional method calls of an application programming interface selected from the group consisting of create(), getAttributeName() and setAttributeName().

31. The system of claim 30, further comprising means for performing runtime checks prior to executing a method call including means for querying a security engine to determine if the method call is authorized and means for querying back-end adapters to determine if there are pending back-end mapped data updates, for keeping cache data synchronized and updated with back-end mapped data.

32. The system of claim 21, wherein a context definition comprises a Map/Cache/Secure Table.

33. The system of claim 21, wherein the means for sending attribute data to clients comprises means for sending attribute data to client applications running on web browsers and sending attribute data to trusted Java applications running on client machines.

34. A system for dynamically mapping Dynamic Multi-sourced Persisted EJB attributes to source system resources, comprising:

an application server including contexts connected to JMS adapters;

a data cache connected to the contexts in the application server for providing BMP data for mapping Dynamic Multi-sourced Persisted EJB attributes to back-end system data fields;

system adapters for connecting JMS adapters to back-end systems; and an XML data storage device for providing context definition documents to the contexts and JMS adapters in the application server and to the system adapters.

35. The system of claim 34, wherein the contexts include Dynamic Multi-sourced Persisted EJB instances and Session EJB Wrappers mapped to source system data.

36. A system for dynamically mapping Dynamic Multi-sourced Persisted EJB attributes to source system resources, comprising:

a context definition containing attributes representing collections of source system data;

an attribute mapping element for specifying whether each attribute in the context definition is mapped to a field in a data source;

the context definition being stored in a persistent data cache;

an instance of a Dynamic Multi-sourced Persisted EJB being created;

the attributes in the context definition being applied to the created instance of the Dynamic Multi-sourced Persisted EJB for mapping the specified attributes to source system data fields;

mapped source system data being accessed by the Dynamic Multi-sourced Persisted EJB instance without requiring EJB compilation and deployment; and mapped attribute data being sent from source systems to clients and from clients to source systems in response to client queries. --

UNITED STATES PATENT AND TRADEMARK OFFICE

CERTIFICATE OF CORRECTION

PATENT NO. : 6,996,565 B2
APPLICATION NO. : 10/064965
DATED : February 7, 2006
INVENTOR(S) : Skufca et al.

It is certified that error appears in the above-identified patent and that said Letters Patent is hereby corrected as shown below:

Delete the title page and substitute therefore the attached title page showing the corrected number of claims in patent.

Column 16, line 45, insert allowed claims 17-36:

-- 17. The method of claim 16, further comprising performing runtime checks prior to executing a method call including querying a security engine to determine if the method call is authorized and querying back-end adapters to determine if there are pending back-end mapped data updates for keeping cache data synchronized and updated with back-end mapped data.

18. The method of claim 1, wherein the step of creating a context definition further comprises creating a Map/Cache/Secure table.

19. The method of claim 1, wherein the step of sending attribute data to clients comprises sending attribute data to client applications running on web browsers and sending attribute data to trusted Java applications running on client machines.

20. A computer-readable medium containing instructions for controlling a computer system to implement the method of claim 1.

21. A system for dynamically mapping Dynamic Multi-sourced Persisted EJB attributes to source system resources, comprising:

means for creating a context definition for containing attributes representing collections of source system data;

an element for specifying whether an attribute in the context definition is mapped to a field in a data source;

This certificate supersedes the Certificate of Correction issued August 30, 2011.

Signed and Sealed this
Eleventh Day of October, 2011

David J. Kappos
*Director of the United States Patent and Trademark Office* means for storing the context definition in a persistent data cache within an application server;
means for creating an instance of a Dynamic Multi-sourced Persisted EJB within the application server;
means for applying the attributes in the context definition to the created instance of the Dynamic Multi-sourced Persisted EJB for mapping the specified attributes to source system data fields via back-end adapters;
means for accessing mapped source system data by the Dynamic Multi-sourced persisted EJB instance without requiring EJB compilation and deployment; and
means for sending mapped attribute data from source systems to clients and from clients to source systems in response to client queries.

22. The system of claim 21, wherein each attribute comprises:
an element identifying a data source system table where the attribute value is located if the attribute is mapped;
an element specifying whether the attribute is cached; and
an element specifying access security requirements for the attribute.

23. The system of claim 21, further comprising means for defining a key attribute for enabling access to mapped source system data through adapters.

24. The system of claim 21, wherein each mapped attribute specified in the context definition is mapped to a single field in a data source system.

25. The system of claim 21, wherein an attribute in the context definition is designated to be mapped as a primary field in a data source and data from the primary field is written to other multiple mapped secondary fields in a data source.

26. The system of claim 21, wherein the context definition is an XML document.

27. The system of claim 21, further comprising means for storing selected source and client data in the persistent data cache.

28. The system of claim 21, wherein the means for creating an instance of a Dynamic Multi-sourced Persisted EJB comprises means for creating and accessing an instance of a Dynamic Multi-sourced Persisted EJB from an external application using generic method calls of an application programming interface selected from the group consisting of create(), find(), getAttr(), getAttrs(), getGuid(), setAttr(), setAttrs() and retrieveNewAndDeletedContexts().

29. The system of claim 28, further comprising means for performing runtime checks prior to executing a method call including means for querying a security engine to determine if the method call is authorized and means for querying back-end adapters to determine if there are pending back-end mapped data updates, for keeping cache data synchronized and updated with back-end mapped data.

30. The system of claim 21, wherein the means for creating an instance of a Dynamic Multi-sourced Persisted EJB comprises means for creating and accessing an instance of a Dynamic Multi-sourced Persisted EJB from an external application through a Session EJB Wrapper using traditional method calls of an application programming interface selected from the group consisting of create(), getAttributeName() and setAttributeName().

31. The system of claim 30, further comprising means for performing runtime checks prior to executing a method call including means for querying a security engine to determine if the method call is authorized and means for querying back-end adapters to determine if there are pending back-end mapped data updates, for keeping cache data synchronized and updated with back-end mapped data.

32. The system of claim 21, wherein a context definition comprises a Map/Cache/Secure Table.

33. The system of claim 21, wherein the means for sending attribute data to clients comprises means for sending attribute data to client applications running on web browsers and sending attribute data to trusted Java applications running on client machines.

34. A system for dynamically mapping Dynamic Multi-sourced Persisted EJB attributes to source system resources, comprising:

an application server including contexts connected to JMS adapters;
a data cache connected to the contexts in the application server for providing BMP data for mapping Dynamic Multi-sourced Persisted EJB attributes to back-end system data fields;
system adapters for connecting JMS adapters to back-end systems; and
an XML data storage device for providing context definition documents to the contexts and JMS adapters in the application server and to the system adapters.

35. The system of claim 34, wherein the contexts include Dynamic Multi-sourced Persisted EJB instances and Session EJB Wrappers mapped to source system data.

36. A system for dynamically mapping Dynamic Multi-sourced Persisted EJB attributes to source system resources, comprising:

a context definition containing attributes representing collections of source system data;
an attribute mapping element for specifying whether each attribute in the context definition is mapped to a field in a data source;
the context definition being stored in a persistent data cache;
an instance of a Dynamic Multi-sourced Persisted EJB being created;
the attributes in the context definition being applied to the created instance of the Dynamic Multi-sourced Persisted EJB for mapping the specified attributes to source system data fields;
mapped source system data being accessed by the Dynamic Multi-sourced Persisted EJB instance without requiring EJB compilation and deployment; and
mapped attribute data being sent from source systems to clients and from clients to source systems in response to client queries. --

(12) United States Patent
Skufca et al.

(10) Patent No.: US 6,996,565 B2
(45) Date of Patent: *Feb. 7, 2006

(54) SYSTEM AND METHOD FOR DYNAMICALLY MAPPING DYNAMIC MULTI-SOURCED PERSISTED EJBS

(75) Inventors: Jim Skufca, Austin, TX (US); David Smith, Austin, TX (US); Rob Bugh, Austin, TX (US); John Buslawski, Austin, TX (US)

(73) Assignee: Initiate Systems, Inc., Chicago, IL (US)

( * ) Notice: Subject to any disclaimer, the term of this patent is extended or adjusted under 35 U.S.C. 154(b) by 545 days.

This patent is subject to a terminal disclaimer.

(21) Appl. No.: 10/064,965

(22) Filed: Sep. 4, 2002

(65) Prior Publication Data

US 2003/0051063 A1 Mar. 13, 2003

Related U.S. Application Data

(60) Provisional application No. 60/317,700, filed on Sep. 6, 2001.

(51) Int. Cl.
*G06F 17/30* (2006.01)

(52) U.S. Cl. ........................................ 707/10; 707/104.1

(58) Field of Classification Search .................... 707/3, 707/10, 100, 104.1; 705/1, 8, 36; 709/201, 709/202, 223, 246; 711/209; 715/513; 719/310, 719/315

See application file for complete search history.

(56) References Cited

U.S. PATENT DOCUMENTS

| | | | | |
|---|---|---|---|---|
| 6,449,620 | B1 | 9/2002 | Draper et al. | |
| 6,757,708 | B1 * | 6/2004 | Craig et al. | 709/203 |
| 2002/0152422 | A1 * | 10/2002 | Sharma et al. | 714/13 |

FOREIGN PATENT DOCUMENTS

| | | |
|---|---|---|
| WO | WO 01/59586 A2 | 8/2001 |
| WO | WO 01/75679 A1 | 10/2001 |

OTHER PUBLICATIONS

Scott W. Ambler, Overcoming data design challenges, Aug. 2001, pp. 1-3.*

* cited by examiner

*Primary Examiner*—Apu M. Mofiz
(74) *Attorney, Agent, or Firm*—DLA Piper Rudnick Gray Cary US LLP; Andrew V. Smith

(57) ABSTRACT

Dynamic Multi-sourced Persisted Enterprise Java Bean (EJB) instances are dynamically created on a J2EE compliant Application Server to access data contained in multiple data source systems. This Dynamic Multi-sourced Persisted EJB is a general class responsible for dynamically aggregating source system information and it to data in the source systems based on a Context definition. Individual EJB attributes that include mapping, caching and security definitions are mapped to individual pieces of data in source systems by the Context definition. A mapping definition can be reloaded during execution as desired. Applications can access the Dynamic Multi-sourced Persisted Entity EJB directly, or use a Session EJB to create a static interface to the dynamically mapped, cached and secured data. Dynamic mapping of Context definition attributes to source system data for transferring data between client and source systems and for modifying data attributes are achieved without recoding, recompiling and redeploying of custom coded solutions.

36 Claims, 8 Drawing Sheets